United States Patent
Fitz et al.

(10) Patent No.: US 11,261,925 B2
(45) Date of Patent: Mar. 1, 2022

(54) OPERATING A CLUTCH DEVICE

(71) Applicant: GKN Automotive Ltd., Birmingham (GB)

(72) Inventors: Rudolf Fitz, Troisdorf (DE); Eric Rene Esch, Euskirchen (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/772,206

(22) PCT Filed: Dec. 13, 2017

(86) PCT No.: PCT/EP2017/082570
§ 371 (c)(1),
(2) Date: Jun. 12, 2020

(87) PCT Pub. No.: WO2019/114941
PCT Pub. Date: Jun. 20, 2019

(65) Prior Publication Data
US 2021/0071724 A1    Mar. 11, 2021

(51) Int. Cl.
*F16D 48/06*  (2006.01)

(52) U.S. Cl.
CPC .... *F16D 48/064* (2013.01); *F16D 2200/0052* (2013.01); *F16D 2500/1045* (2013.01);
(Continued)

(58) Field of Classification Search
None
See application file for complete search history.

(56) References Cited

U.S. PATENT DOCUMENTS

| | | | |
|---|---|---|---|
| 6,086,514 A * | 7/2000 | Jones | F16D 48/066 477/180 |
| 2011/0125378 A1 * | 5/2011 | Blessing | F16D 48/06 701/68 |
| 2012/0158264 A1 | 6/2012 | Kuras et al. | |

FOREIGN PATENT DOCUMENTS

| | | |
|---|---|---|
| CN | 102072268 A | 5/2011 |
| CN | 104565127 A | 4/2015 |
| | (Continued) | |

OTHER PUBLICATIONS

International Search Report and Written Opinion for PCT/EP2017/082570 dated Sep. 20, 2018 (12 pages; with English translation).
(Continued)

*Primary Examiner* — Timothy Hannon
(74) *Attorney, Agent, or Firm* — Bejin Bieneman PLC

(57) ABSTRACT

A clutch device has at least a multiplicity of clutch discs which are in frictional contact with one another, and a control unit which controls the clutch device. The clutch device is calibrated repeatedly during an operating time of the clutch device. A first calibration is performed at a first point in time. A second calibration is performed at a second point following the first calibration. The first point in time and the second point in time are within a first operating time of the clutch device and occur within a first time interval. At least a third calibration is performed in a subsequent second operating time at a third point in time. At least the second calibration is performed within a second interval of the third point in time. The first and second intervals are determined by the control unit based on a mileage of a vehicle or an energy input into the clutch device. The first interval is shorter than the second interval.

20 Claims, 2 Drawing Sheets

(52) U.S. Cl.
CPC ........... *F16D 2500/3104* (2013.01); *F16D 2500/3166* (2013.01); *F16D 2500/50251* (2013.01)

(56) References Cited

FOREIGN PATENT DOCUMENTS

| | | |
|---|---|---|
| CN | 105246758 A | 1/2016 |
| CN | 107298091 A | 10/2017 |
| DE | 102007021302 A1 | 11/2008 |
| DE | 102010052819 A1 | 6/2011 |
| DE | 102007002343 A1 | 7/2018 |
| EP | 1760349 A2 | 3/2007 |
| JP | H074450 A | 1/1995 |

OTHER PUBLICATIONS

Chinese Office Action dated Mar. 23, 2021 for application No. CN201780097665.0 (11 pages; with English translation).

* cited by examiner

OPERATING A CLUTCH DEVICE

CROSS-REFERENCE TO RELATED APPLICATIONS

This application is a national stage of, and claims priority to, Patent Cooperation Treaty Application No. PCT/EP2017/082570, filed on Dec. 13, 2017, which application is hereby incorporated herein by reference in its entirety.

BACKGROUND

In the case of locking differentials used in motor vehicles (here as a clutch device) an actual transferred torque can be (only) estimated when requesting the transmission of a target torque via the clutch device. The estimate is based on a characteristic curve that contains the kiss point and thus describes the characteristics of the clutch device. The so called "kiss point" can be referred to as a gripping point; a state of the clutch device or of the clutch plates together forming the frictional contact (a clutch of the clutch device), in which a torque is just transferred from a drive shaft via the clutch plates to an output shaft. This characteristic can be determined on a test bench based on a representative clutch device taking into account temperature and coefficients of friction and can be stored in a control unit. During an operating time of the clutch device installed in a motor vehicle, the clutch plates wear and the coefficient of friction changes. As a result, the characteristic curve shifts and the actual torque, which is actually transmitted, deviates from the target torque. To counteract this, a (post-flow) calibration is performed either after a specified mileage or after a specified energy input. The calibration compensates the wear and raises the kiss point (or compensates for the difference in the distance that the plates have to move to reach the kiss point) in order to (substantially) compensate the deviation between the target torque and the actual torque.

There is a constant need to improve the operation of clutch devices and, in particular, to ensure a high degree of matching between the actual torque and the target torque at all times during the operating time of a clutch device.

SUMMARY

The present disclosure relates to a method for the operation of a clutch device, in particular for a multi-plate clutch, preferably for a clutch which is arranged on a side shaft of a motor vehicle, so that by engaging a clutch of the clutch device the whole axle (here the clutch device is referred to as a booster) is connected to a drive unit of the motor vehicle so as to transfer torque, or by engaging each clutch of two clutches of the clutch device only one wheel (here the clutch device is also referred to as a Twinster®) of the motor vehicle is connected to a drive unit of the motor vehicle so as to transfer torque. The clutch device comprises at least a plurality of clutch plates in mutual frictional contact and a control device controlling the clutch device.

The present disclosure provides a method for the operation of a clutch device, by which a high degree of matching of the actual torque and the target torque can be ensured at all times during the operating time of a clutch device.

A method for operating a clutch device is proposed, wherein the clutch device has at least a plurality of clutch plates in contact with each other and a control unit controlling the clutch device, wherein the clutch device is calibrated multiple times during an operating time of the clutch device. The method comprises:

a) Performing a first calibration at a first point in time and performing a second calibration following the first calibration at a second time, wherein the first point in time and the second point in time are in a first operating time of the clutch device and occur within a first interval; and b) Performing at least a third calibration in a subsequent second operating time at a third point in time, wherein at least the second calibration is performed within a second interval of the third point in time;

wherein the first and second intervals are determined by the control unit based on a mileage of a motor vehicle or an energy input into the clutch device, wherein the first interval is shorter than the second interval.

The method is aimed in particular at taking into account a setting behavior of the clutch plates in a first operating time. In particular, in the case of carbon plates, it has been observed that in a first operating time (beginning with commissioning of the clutch device and starting from a new condition of the clutch plates) a pronounced setting behavior follows. In this case, the kiss point or the travel by which an actuator of the clutch device must shift the clutch plates towards each other to engage the clutch device changes by a particularly large extent. As a result of the setting behavior, deviations from the target torque to the actual torque of up to 30% could be detected compared to conventional calibration of the clutch device.

In the present case, it is proposed to carry out the calibration (or the calibration processes included therein) in a first operating time (i.e., starting with commissioning the clutch device and starting from a new condition of the clutch plates) differently, in particular with an increased repetition frequency, than a calibration in a second operating time following the first operating time.

A calibration comprises in particular the actuation of the clutch device, wherein, for example, the clutch plates of a clutch of the clutch device are shifted from a disengaged position of the clutch to the kiss point. The kiss point can be detected by the control unit based on a (low) torque transmitted via the clutch plates.

The calibration changes the position of the kiss point, so that an actuator of the clutch device must shift the clutch plates by a changed travel (based on the changed position of the kiss point) in order to transmit a predetermined torque. The aim here is to achieve the lowest possible deviation from the target torque to the actual torque.

The calibration that is carried out in the first operating time is carried out especially in calibration processes according to specified first intervals. In this case, the intervals are determined (exclusively) based on a mileage of the motor vehicle (i.e., driven kilometers of the motor vehicle and the clutch device, in whose powertrain the clutch device is installed) or (exclusively) based on an energy input into the clutch device.

The first interval is shorter (in time) or smaller than the second interval, i.e., in particular such that the first interval is smaller than the second interval if (for a comparison of the intervals) the same scale is or would be set for both intervals (i.e., determination of both intervals with the same dependency either on the mileage or on the energy input).

The energy input [kilojoules] is, in particular, the power integrated over time [Watts], which is transmitted via the clutch device (from a drive shaft to an output shaft) and via the clutch plates. The energy input can be determined, for example, from the (drive) torques transmitted during the operating time and, if necessary, additionally from the speeds of the drive shaft and the output shaft. Via the drive shaft, in particular a torque of the drive unit of the motor vehicle is transferred to the clutch device, wherein a torque is transferred via the output shaft from the clutch device to (at least or exactly) one wheel of the motor vehicle.

In particular, the first interval is determined based on the energy input and the second interval based on the mileage.

Preferably, first intervals within the first operating time are determined based on the energy input and amount to less than 30 kJ [kilojoules], in particular less than 20 kJ, preferably not more than 10 kJ. In any case, the first intervals are at least 2 kJ, preferably at least 5 kJ.

The second interval may be determinable based on the energy input (although it may be determined based on the mileage during the calibration), wherein the second interval is at least 50 kJ [kilojoules], in particular at least 80 kJ, preferably at least 100 kJ. In particular, the second interval is no more than 500 kJ.

According to one example, the method is carried out with clutch devices in which the plurality of clutch plates are formed by carbon plates.

In particular, at least in the first operating time, in the case of a requirement for the transmission of a target torque via the clutch device, an actual torque with a deviation from the target torque of not more than 10% shall be transferred, preferably with a deviation of not more than 5%.

According to one example, the setting behavior of the clutch device, or a representative clutch device occurring at least during the first operating time, is determined in a test field (a test device) by applying energy inputs and determining the kiss point of the clutch device, which changes based on the energy input. The relationship of the energy input and the kiss point determined in this way is stored in the control unit (of the clutch device of the same type installed in the motor vehicle). The energy input obtained during the operation of the clutch device (installed in the motor vehicle) (with clutch plates initially in new condition) is determined by the control unit and at least the first interval is determined by the control unit based on the determined energy input.

In particular, when a first interval or a second interval is exceeded, a calibration is carried out immediately after a restart of a drive unit (internal combustion engine or electric machine or both, etc.) of a motor vehicle.

In particular, when a first interval or a second interval is exceeded, a calibration is carried out during the operation of the drive unit of a motor vehicle.

The first operating time extends (preferably starting from 0 kJ) in particular up to an energy input of at least 50 kJ [kilojoules], preferably of at least 80 kJ or at least 100 kJ.

A motor vehicle is proposed, at least having a drive unit (an internal combustion engine and/or an electric drive unit, each for the propulsion of the motor vehicle), a clutch device and a control unit. The control unit is suitable for carrying out the method described here and can perform the method described here during the operation of the motor vehicle.

As a precautionary measure, it should be noted that the numerals used here ("first", "second", . . . ) are primarily (only) used to distinguish between multiple similar objects, variables or processes, i.e., in particular do not necessarily specify a dependence and/or an order of these objects, variables or processes relative to each other. If a dependency and/or order is required, this is explicitly stated here, or it is obvious to the person skilled in the art when studying the specifically described example.

SUMMARY OF THE DRAWINGS

The disclosure and the technical environment are explained in more detail below with reference to the figures. It should be noted that the disclosure should not be limited by the examples shown. In particular, unless explicitly stated otherwise, it is also possible to extract partial aspects of the substantive matter explained in the figures and to combine them with other components and findings from the present description and/or figures. The same reference characters denote the same objects, so that explanations from other figures can be used in addition if necessary. In the figures:

FIG. 1 shows a motor vehicle 15 having a drive unit 17 and a clutch device 1 arranged on one axle of the motor vehicle 15, by which a drive shaft 18 can be controllably connected to an output shaft 19 for the transmission of a torque from the drive unit 17 to the wheel.

FIG. 2 shows the clutch device 1, by which the drive shaft 18 can be controllably connected to the output shaft 19 for the transmission of a torque. Clutch plates 2 of the clutch device 1 are moved towards each other by an actuator 20 and form a friction-locking connection for the transmission of the torque. The actuator 20 is operated by the control unit 3.

FIG. 3 shows a first diagram in which the actuation of the (electromechanical) actuator 20, here angular increments 21 of an electrically driven axle (vertical axis), against an energy input 16 of the clutch device 1 (horizontal axis) is shown. A curve 23 shows the displacement of the kiss point based on the energy input 16 into the clutch device 1.

It can be seen that, after an initial commissioning of the clutch device 1, a clear setting behavior of the clutch device 1 occurs, i.e., the displacement of the kiss point is stronger here than in later phases of the operation of the clutch device 1.

Figure 1:
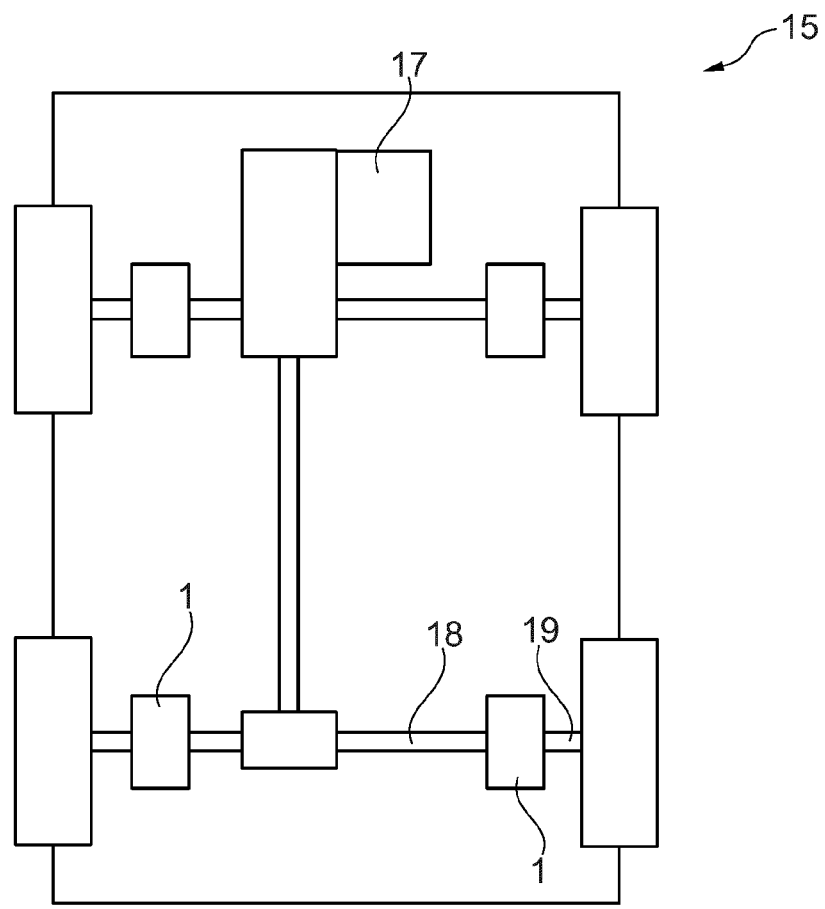
FIG. 1: shows schematically a motor vehicle.
Figure 2:
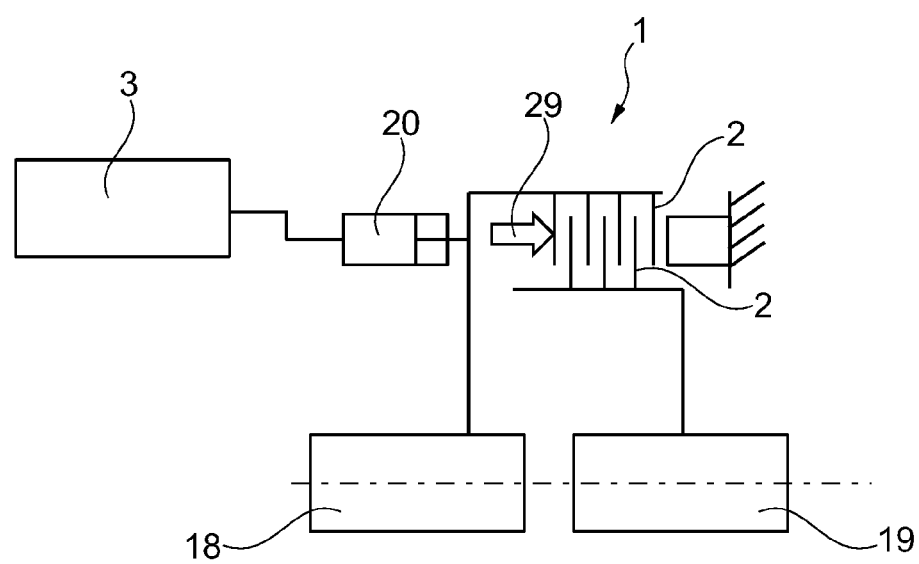
FIG. 2: shows schematically a clutch device.
Figure 3:
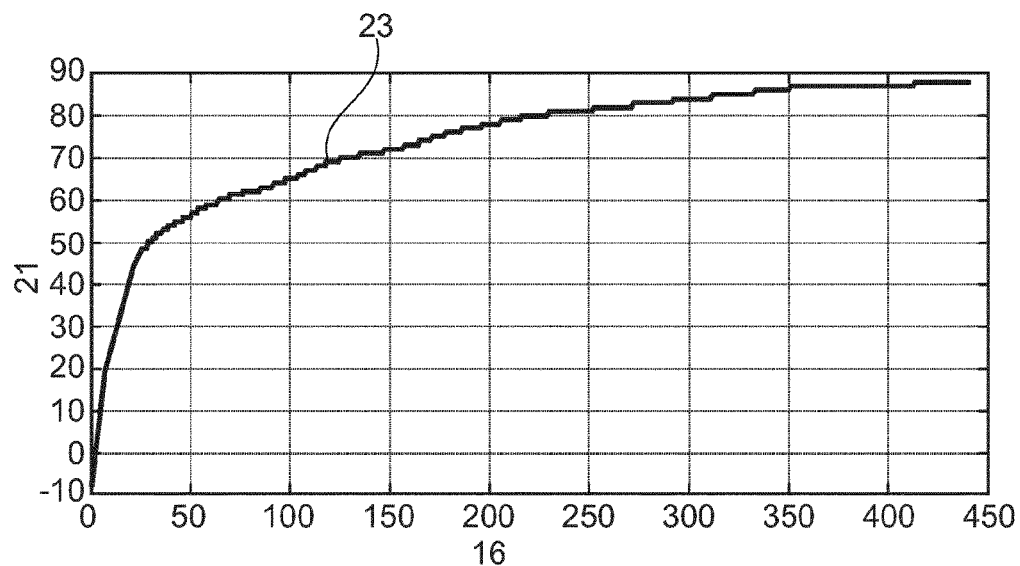
FIG. 3: shows schematically a first diagram showing the actuation of an actuator by means of the energy input.
Figure 4:
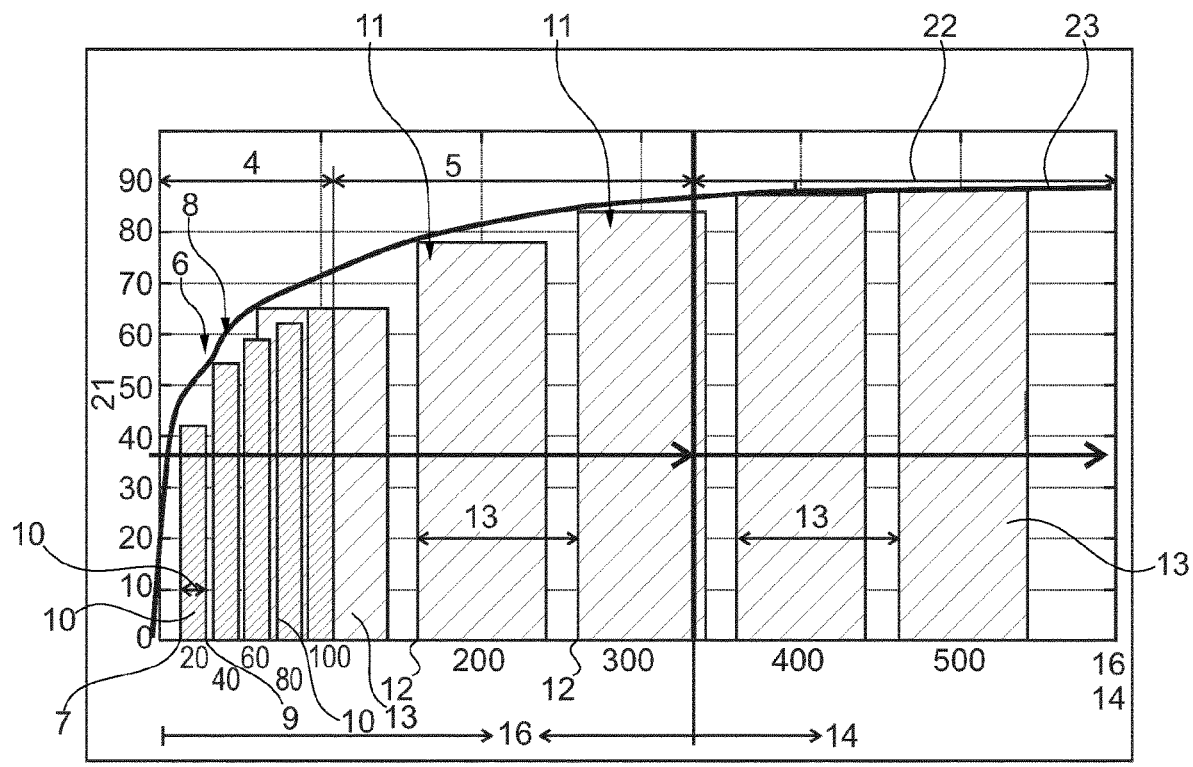
FIG. 4: shows schematically a second diagram showing the actuation of an actuator by means of the energy input and the different intervals.

FIG. 4 shows (as in FIG. 3) a second diagram in which the actuation of the actuator 20 via the energy input 16 or mileage 14 (horizontal axis) and different intervals 10, 13 are shown. Again, the curve 23 shows the displacement of the kiss point on the basis of the changing angle increments 21 (vertical axis).

According to step a) of the method, a first calibration 6 is performed at a first point in time 7 and a second calibration 8 is performed at a second point in time 9 following the first calibration 6, wherein the first point in time 7 and the second point in time 9 are in a first operating time 4 of the clutch device 2 and take place within a first interval 10. According to step b) of the method, at least a third calibration 11 is carried out in a subsequent second operating time 5 at a third point in time 12, wherein a calibration 8, 6 preceding the third calibration 11 is carried out within a second interval 13 of the third point in time 12. The intervals 10, 13 are determined by the control unit 3 (initially) based on the energy input 16 into the clutch device 1 (and the second intervals 13 are determined later based on the mileage 14 of the motor vehicle 15 or the clutch device 1), wherein the first intervals 10 are shorter than the second intervals 13.

In the present case, the calibration 6, 8 in a first operating time 4 is carried out differently, namely with an increased repetition frequency, from a calibration 11 in a second operating time 5 or a third operating time 22 following the first operating time 4.

The first and second calibrations 6, 8 carried out in the first operating time 4 are carried out in calibration processes within specified first intervals 10. In this case, the first intervals 10 are determined exclusively based on the energy input 16 into the clutch device 1.

The third calibrations 11 carried out in the second operating time 5 are carried out in calibration processes within specified second intervals 13. In this case, the second intervals 13 are determined exclusively based on the energy input 16 into the clutch device 1.

The first intervals 10 are shorter than the second intervals 13.

The first intervals 10 in the first operating time 4 amount to approximately 20 kJ. The second intervals in the second operating time 5 amount to approximately 100 kJ. It can be seen that the setting behavior occurring just in the first operating time 4 can be better compensated owing to the shorter first intervals 10, so that the changing kiss point of the clutch device 1 can be tracked better.

The second interval 13 is determined in the second operating time 5 based on the energy input 16. In a third operating time 22, which follows the second operating time 5, the second interval 13 is determined based on the mileage 14.

The first operating time 4 extends from 0 kJ to an energy input 16 of approximately 100 kJ. The second operating time 5 follows the first operating time 4 and extends up to an energy input 16 of approximately 300 kJ. The third operating time 22 follows the second operating time 5 and extends to the end of the operating time of the clutch device 1.

REFERENCE NUMERALS 1 clutch device
2 clutch plates
3 control unit
4 first operating time
5 second operating time
6 first calibration
7 first point in time
8 second calibration
9 second point in time
10 first interval
11 third calibration
12 third point in time
13 second interval
14 mileage
15 motor vehicle
16 energy input
17 drive unit
18 drive shaft
19 output shaft
20 actuator
21 angle increments
22 third operating time
23 curve

The invention claimed is:

1. A method for operating a clutch device including at least a plurality of clutch plates in frictional contact with each other and a control unit controlling the clutch device, wherein the clutch device is calibrated multiple times during an operating time of the clutch device; the method comprising:
performing a first calibration at a first time;
performing a second calibration at a second time following the first calibration, wherein the first time and the second time are within a first operating time of the clutch device and occur within a first interval; and
performing at least a third calibration in a subsequent second operating time at a third time, wherein the second time and the third time occur within a second interval;
wherein the first and second intervals are determined by the control unit based on a mileage of a vehicle or an energy input into the clutch device;
wherein the first interval is shorter than the second interval.

2. The method of claim 1, wherein the first interval is determined based on the energy input and the second interval is determined based on the mileage.

3. The method of claim 1, wherein the first interval is determined based on the energy input, wherein the first interval is less than 30 kilojoules.

4. The method of claim 3, wherein the second interval is determined based on the energy input, wherein the second interval amounts to at least 50 kilojoules.

5. The method of claim 1, wherein the plurality of clutch plates are carbon plates.

6. The method of claim 1, further comprising, at least in the first operating time, in the case of a request for transmission of a target torque via the clutch device, transferring an actual torque with a deviation relative to the target torque of not more than ten per cent.

7. The method of claim 1, further comprising:
determining a setting behavior of the clutch device at least during the first operating time in a test field by applying energy inputs and determining a change of the kiss point of the clutch device as a function of the energy input;
storing the relationship of the energy input and a kiss point in the control unit; and
determining, in the control unit, at least the first interval based on determining the energy input carried out during the operating time of the clutch device.

8. The method of claim 1, further comprising, upon the first interval or the second interval being exceeded, performing the third calibration after a restart of a drive unit of a vehicle.

9. The method of claim 1, further comprising, upon the first interval or the second interval being exceeded, performing the third calibration during the operating time of a drive unit of a vehicle.

10. The method of claim 1, wherein the first operating time extends to the energy input of at least 50 kilojoules.

11. A system for a vehicle, comprising:
a clutch device that includes a plurality of clutch plates in frictional contact with each other; and
a control unit programmed to:
determine first and second intervals based on a mileage of the vehicle or an energy input to the clutch device;
perform a first calibration at a first time;
perform a second calibration at a second time following the first calibration, wherein the first time and the second time are within a first operating time of the clutch device and occur within the first interval; and perform at least a third calibration in a subsequent second operating time at a third time, wherein the second time and the third time occur within the second interval;

wherein the first interval is shorter than the second interval.

12. The system of claim 11, wherein the control unit is further programmed to determine the first interval based on the energy input and the second interval based on the mileage.

13. The system of claim 11, wherein the control unit is further programmed to determine the first interval based on the energy input, wherein the first interval is less than 30 kilojoules.

14. The system of claim 13, wherein the control unit is further programmed to determine the second interval based on the energy input, wherein the second interval amounts to at least 50 kilojoules.

15. The system of claim 11, wherein the plurality of clutch plates are carbon plates.

16. The system of claim 11, wherein, at least in the first operating time, in the case of a request for transmission of a target torque via the clutch device, the control unit is further programmed to transfer an actual torque with a deviation relative to the target torque of not more than ten per cent.

17. The system of claim 11, wherein the control unit is further programmed to:

determine a setting behavior of the clutch device at least during the first operating time in a test field based on a relationship of the energy input and a kiss point stored in a memory of the control unit, wherein the relationship is determined by applying energy inputs and determining a change of the kiss point of the clutch device as a function of the energy input; and determine at least the first interval based on determining the energy input carried out during the operating time of the clutch device.

18. The system of claim 11, wherein the control unit is further programmed to, upon the first interval or the second interval being exceeded, perform the third calibration after a restart of a drive unit of the vehicle.

19. The system of claim 11, wherein the control unit is further programmed to, upon the first interval or the second interval being exceeded, perform the third calibration during the operating time of a drive unit of the vehicle.

20. The system of claim 11, wherein the first operating time extends to the energy input of at least 50 kilojoules.

* * * * *